S. A. WELLMAN.
Hog-Catcher.

No. 222,850.  Patented Dec. 23, 1879.

UNITED STATES PATENT OFFICE.

SETH A. WELLMAN, OF AMBOY, ILLINOIS.

IMPROVEMENT IN HOG-CATCHERS.

Specification forming part of Letters Patent No. 222,850, dated December 23, 1879; application filed October 21, 1879.

*To all whom it may concern:*

Be it known that I, SETH A. WELLMAN, of Amboy, in the county of Lee and State of Illinois, have invented certain new and useful Improvements in Hog-Catchers; and I do hereby declare the following to be a full, clear, and exact description of the invention, such as will enable others skilled in the art to which it pertains to make and use it, reference being had to the accompanying drawings, which form part of this specification.

My invention relates to an improvement in devices for catching hogs; and it consists in a long handle having a rod pivoted to its end, and pivoted upon this rod, near its center, is a hook that is made of a double thickness of material, and which moves back and forth along the handle, as will be more fully described hereinafter.

Figure 1:
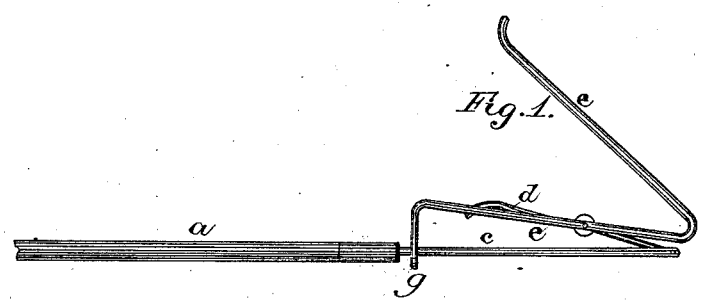
Figure 2:
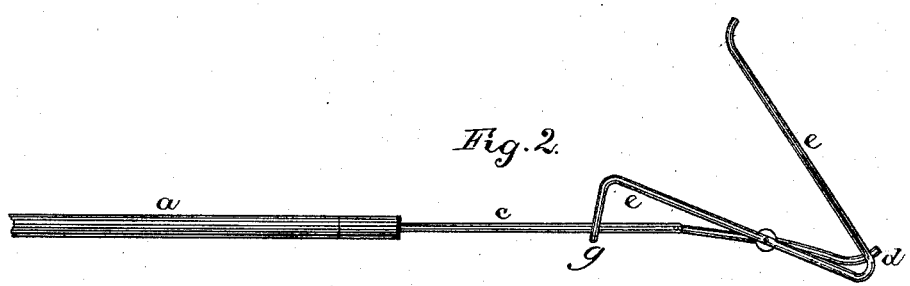
Figure 3:
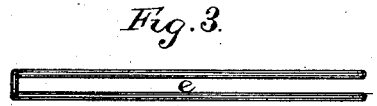

Figure 1 is a plan view of my invention, showing the device just ready for use. Fig. 2 is a similar view, showing the device closed. Fig. 3 is an edge view of the hook.

$a$ represents a handle of suitable length, having a rod, $c$, secured in its end. Pivoted in or to the end of this rod $c$ is a rod, $d$, and pivoted to this rod $d$, near its center, is the hook $e$. This hook is bent double, as shown in Fig. 3, and has its inner end, $g$, bent, as shown, so as to slide back and forth on the rod $c$. The hook $e$, being made of a double thickness of material, passes over both sides of the rod $d$, so that the rod can play back and forth in between the two prongs, and thus not only insure greater strength and more certainty of action, but will take a sure hold of the hog's leg without the slightest danger of hurting it.

When my device is ready for action the end $g$ is moved along up the rod $c$ until it is near the end of the handle $a$, as shown in Fig. 1, which causes the rod $d$ to stand at such an angle as to leave the hook open. As soon as the hook is caught around a hog's leg the slightest pull upon it causes the hook to slide along the rod $c$ toward the rod's outer end, and as it slides the rod $d$ closes across the mouth of the hook, so as to catch behind the leg, and the greater the pull on the hook the more tightly the leg is held.

Hogs and other small animals can be caught with this implement and held in spite of their endeavors to escape, without the slightest danger of hurting them.

Having thus described my invention, I claim—

An implement for catching hogs, consisting of a handle, a pivoted rod or lever, and a pivoted sliding hook that is fastened to the rod, substantially as shown.

In testimony that I claim the foregoing I have hereunto set my hand this 16th day of October, 1879.

S. A. WELLMAN.

Witnesses:
WM. B. STUART,
THOMAS LOGAN.